Patented Feb. 28, 1928.

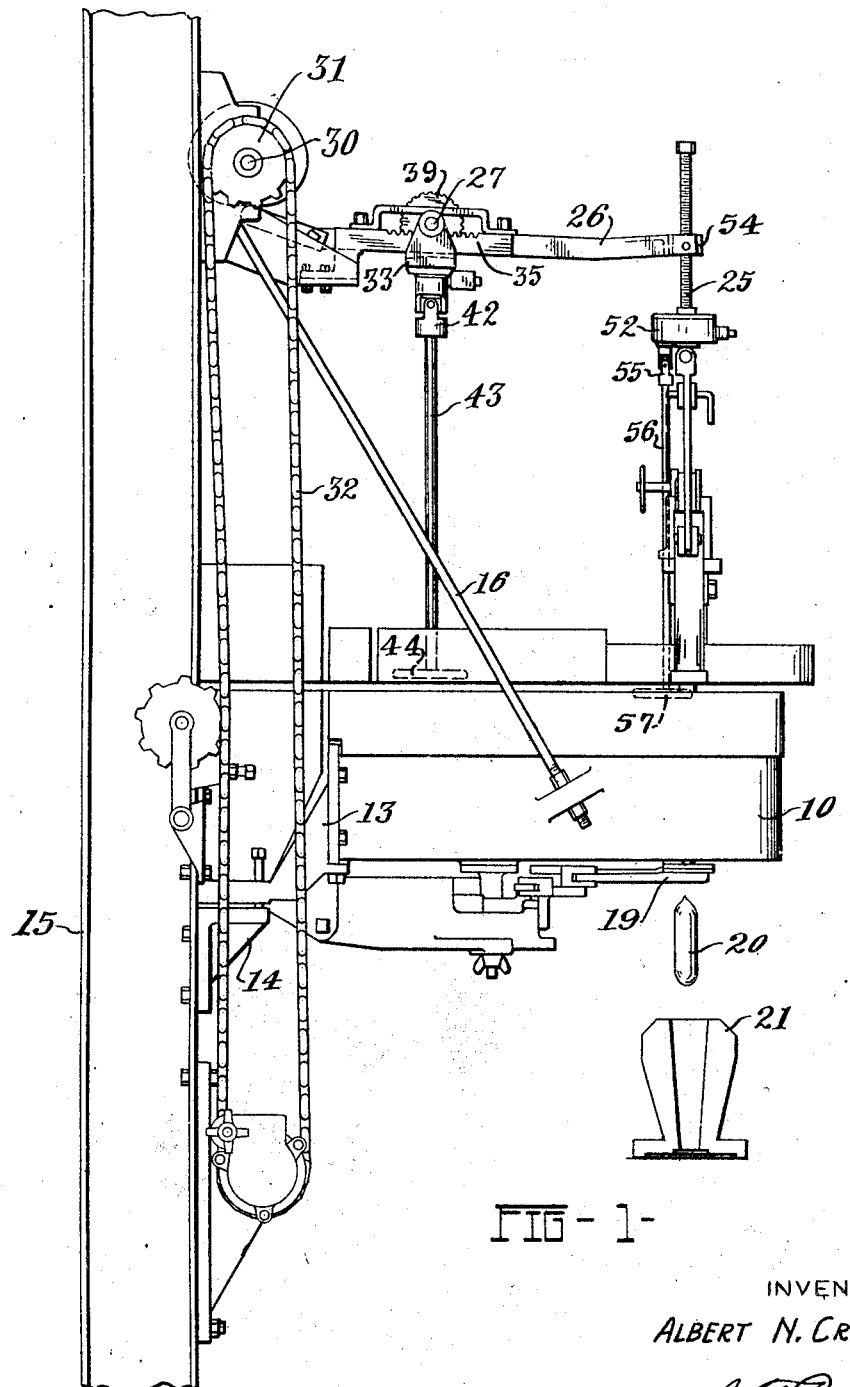

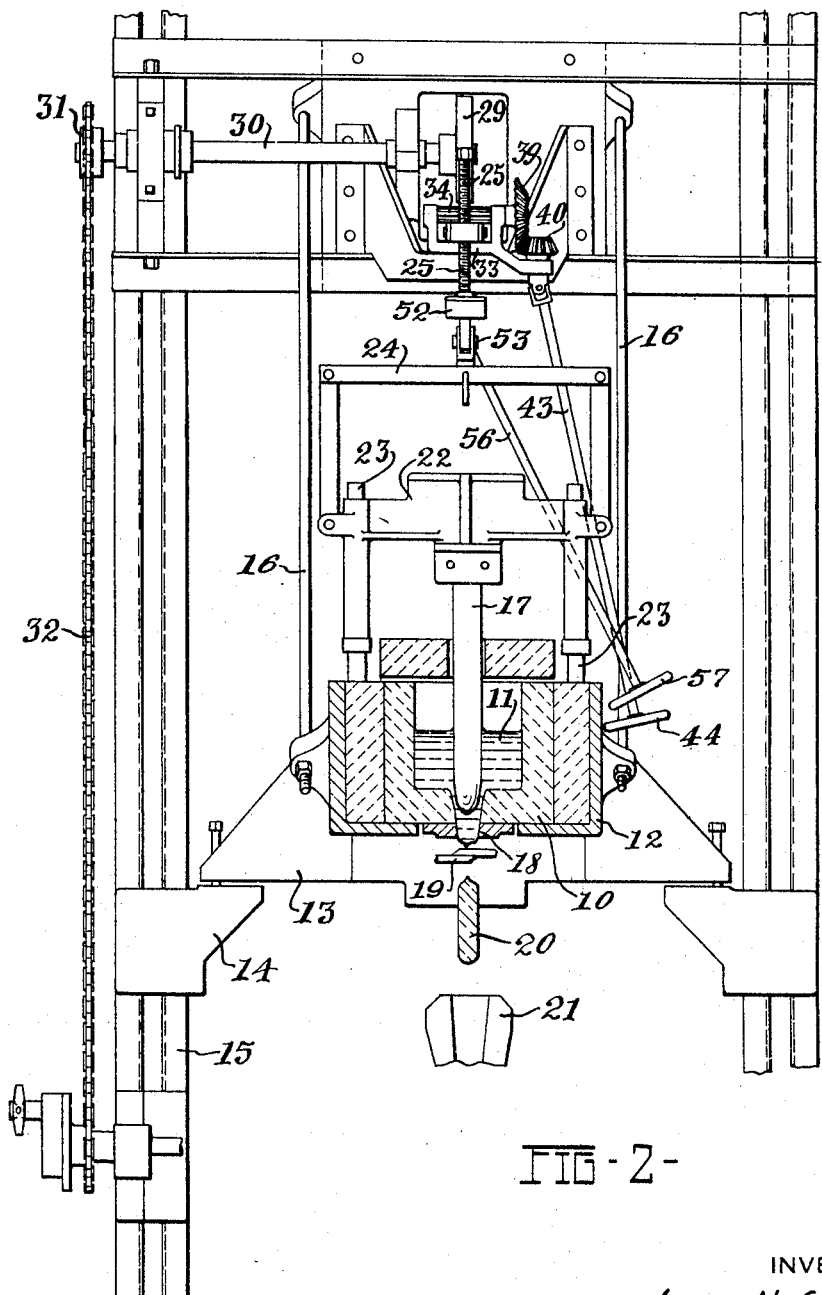
FIG-2-

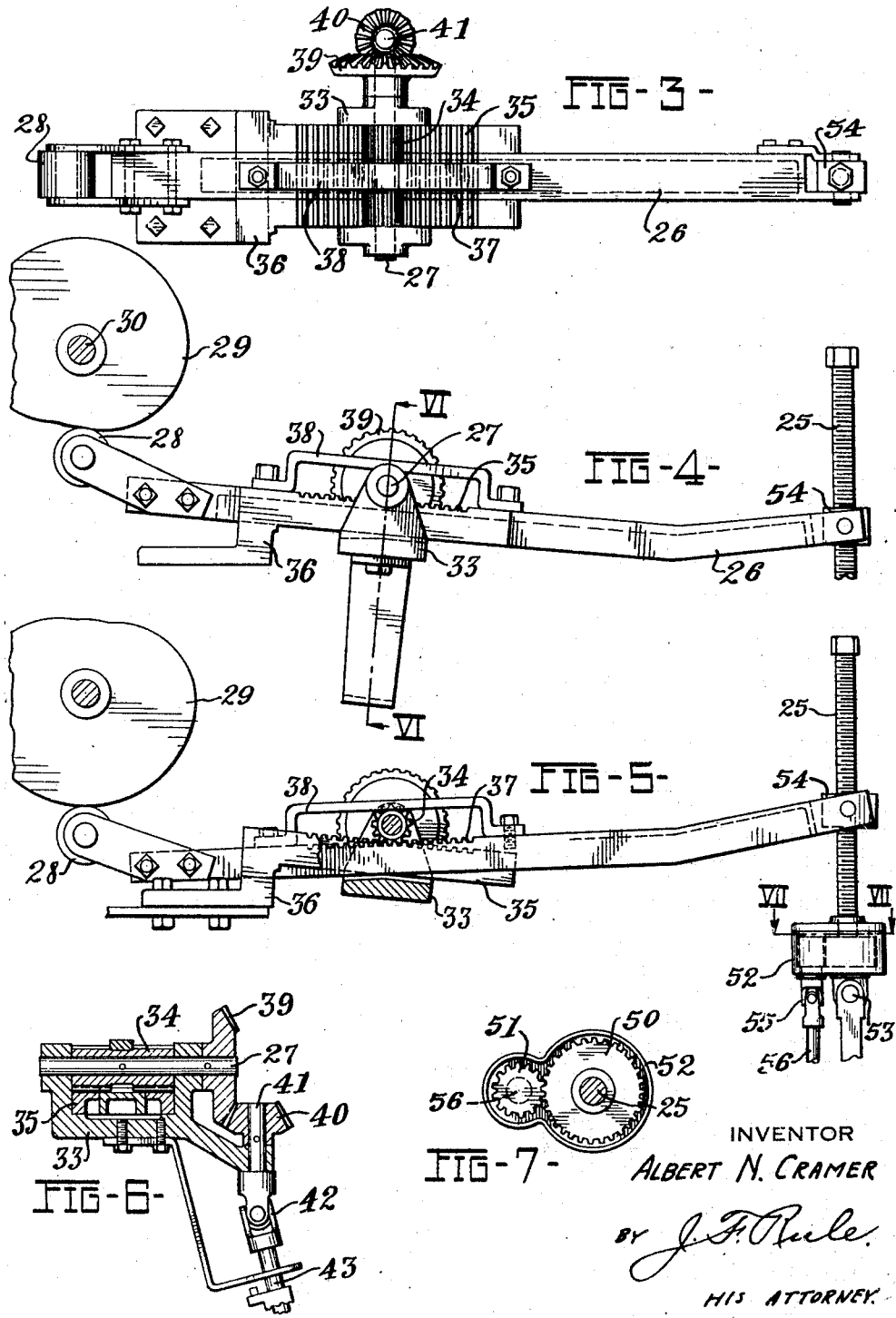

1,660,415

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF OHIO.

GLASS-FEEDING APPARATUS.

Application filed September 4, 1923. Serial No. 660,688.

My invention relates to glass feeders adapted to deliver from a supply of molten glass, individual masses or charges adapted for entering the molds of a glass forming machine. The invention is herein disclosed in connection with a glass feeder of the type in which the glass is discharged through an outlet in the bottom of a container and a plunger or regulator reciprocates vertically in the glass over the outlet to control the issuing glass. The regulator is actuated by a cam operating through a horizontally disposed lever fulcrumed intermediate its ends and having an operative connection at one end with the regulator.

In the practical operation of a feeder of this type, it is frequently necessary to adjust the length of stroke of the regulator or its height in order to regulate the size and shape of the issuing charges or gobs. Such adjustments are often required to compensate for variations in the charges, due to the varying temperature of the issuing glass which has a marked effect on the size and shape of the charge.

A feature of the present invention relates to the means for adjusting the length of stroke of the regulator, and consists in providing a simple and practical means for shifting the fulcrum of the operating lever while the feeder is in operation.

A further feature of the invention relates to improved means which may readily be operated manually while the feeder is in operation, to adjust the regulator up and down relative to the outlet opening.

Other objects of the invention will appear hereinafter.

In the accompanying drawings:

Figure 1 is a side elevation of a glass feeding apparatus constructed in accordance with the present invention.

Figure 2 is a part sectional elevation of the same.

Figure 3 is a plan view on a larger scale of the operating lever and mechanism for adjusting its fulcrum.

Figure 4 is a side elevation of the same.

Figure 5 is a view similar to Figure 4, but with the lever in a different position, parts of the mechanism also being shown in section and other parts being broken away.

Figure 6 is a section at the line VI—VI on Figure 4.

Figure 7 is a section at the line VII—VII on Figure 5.

The feeder comprises a container 10 which may be the usual furnace boot or forehearth, to which molten glass 11 is continuously supplied from the main furnace. The supporting structure for the boot 10 comprises the casing 12, upright channel irons 15, connecting brackets 13 and 14 and diagonal tie rods 16. A regulator in the form of a plunger or plug 17, reciprocates vertically in the glass over the outlet opening 18 in the bottom of the boot and operates in a well known manner to control the size and shape of the issuing charges of glass. Shears 19 operate periodically in timed relation to the movements of the regulator 17 to sever the suspended gobs of glass 20 and permit them to drop into the molds 21 of a forming machine.

The regulator 17 is carried by a yoke 22 slidable up and down on standards 23. The yoke is connected through a frame 24 to a vertical, screw threaded rod 25 connected to the forward end of an operating lever 26, the latter being fulcrumed intermediate its ends on a bearing shaft 27. The inner end of the lever carries a roll 28 which runs on a cam 29 attached to a shaft 30 to which is also secured a sprocket 31 driven by a sprocket chain 32. The chain 32 is driven continuously so that the cam 29 operates through the connections just described to periodically reciprocate the plunger 17.

As the plunger moves downward, it exerts an expelling force on the issuing glass, and as it moves upward, it exerts an upward pull on the glass, thereby retarding the issuance of the glass or in some instances retracting the glass. An important factor in determining the volume of the charge of glass delivered is the length of stroke of the plunger. The size of the charge varies with changes in the temperature of the glass and other conditions which may vary during the operation of the feeder. In order that the length of stroke of the plunger may be quickly adjusted to compensate for such variations, without interrupting or interfering with the operation of the feeder, the following mechanism is provided:

The shaft 27 which forms a fulcrum for the lever 26 is journalled in a yoke 33.

Keyed to said shaft is a pinion 34 in mesh with rack teeth formed on a pair of rack bars or arms 35 projecting forward from and forming part of a stationary bracket 36. The lever 26 extends through the yoke 33 beneath the pinion 34 and between the rack bars 35 and is formed with rack teeth 37 also in mesh with the pinion 34. The lever is supported and held in mesh with the pinion by a strap 38 which extends over said pinion and is bolted at its ends to the lever.

Keyed to the shaft 27 is a bevel gear 39 in mesh with a pinion 40 keyed to a shaft 41 journalled in the yoke 33. The shaft 41 is connected through a universal joint 42 to a rod 43 provided at its lower end with a hand wheel 44. By rotating the hand wheel, the pinion 34 is rotated and thereby caused to roll along the stationary racks 35. At the same time it rolls along the lever 26, thereby shifting the fulcrum 27 lengthwise of the lever. In this manner, the fulcrum may be readily shifted in either direction without interfering with the continuous operation of the feeder.

By moving the fulcrum inward or toward the cam, the length of stroke of the plunger is increased. This results in an increase in the volume of glass delivered during the down stroke of the plunger, so that the weight of the gob is increased. In like manner, the weight of the gob may be reduced by shifting the fulcrum outward and thus decreasing the length of the plunger stroke. This adjusting mechanism provides for a nice adjustment of the size of gob and permits adjustments to be made without in any way interfering with the operation of the feeder, whenever variations in the temperature of the glass, a change in the size of the molds or other conditions make such adjustment desirable.

The mechanism for adjusting the height of the regulating plug will now be described. This mechanism comprises a gear wheel 50 running in mesh with a pinion 51, said gear and pinion being journalled in a gear casing 52 having a pivotal connection 53 with the frame 24. The gear 50 is secured to the lower end of the screw threaded rod 25 which is journalled in and projects upwardly from the casing 52. The connection between the lever 26 and rod 25 comprises a nut or block 54 pivotally connected to the lever and having a screw threaded connection with the rod 25. The shaft of the pinion 51 has a universal joint connection 55 with a downwardly extending adjusting rod 56 on the lower end of which is a hand wheel 57.

By rotating the hand wheel, the screw rod 25 is rotated and thereby caused to travel up or down in the nut 54, thus adjusting the plunger up or down. By adjusting the plunger downward it will, when at the bottom of its operating stroke, more nearly close the outlet and is thus more effective in temporarily retarding the issuing glass. By adjusting the plunger upward, it will be less effective in its retarding action on the glass so that after a charge has been severed, a flow of glass for forming the next charge will be more quickly established.

The two adjusting devices above described for respectively adjusting the length of stroke and the height of the plunger, permit the size and shape of the charges of glass to be adjusted through a considerable range as well as enabling the operator to maintain a substantially uniform size and shape of the charge under conditions which would cause wide variations in such size and weight unless compensated for by such adjustments.

Modifications may be resorted to within the spirit and scope of my invention.

What I claim is:

1. In glass feeding apparatus, the combination of a container from which molten glass is discharged, a regulator to control the discharge, an operating lever connected to said regulator, automatic means for actuating the lever, a rack on the lever, a pinion in mesh with said rack, the shaft of said pinion forming a fulcrum for the lever, and manual means operative during the operation of the feeder for rolling said pinion along the rack and thereby adjusting the fulcrum lengthwise of the lever.

2. In glass feeding apparatus, the combination of a container from which molten glass is discharged, a regulator to control the discharge, an operating lever connected to said regulator, automatic means for actuating the lever, a stationary rack, a pinion supported thereon in mesh with the rack and forming a support on which the lever is fulcrumed, a rack on the lever in mesh with the pinion, and manual means for rotating the pinion and causing it to roll along said racks, whereby the fulcrum is shifted lengthwise of the lever.

3. In glass feeding apparatus, the combination of a container for molten glass provided with an outlet through which the glass issues, a regulator extending into the glass in the container and movable toward and from the outlet, a lever for actuating said regulator, automatic means for periodically rocking the lever about its fulcrum, adjustable connecting means between the lever and said regulator comprising a screw threaded rod operatively connected with the regulator, a nut threaded on said rod and pivotally connected to the lever, a gear connected to said rod, a pinion in mesh with said gear, and an adjusting rod connected to said pinion.

4. Glass feeding mechanism comprising, in combination, a container for molten glass having an outlet opening in the bottom thereof, a regulating plunger projecting into the glass over said opening, a horizontally disposed lever, operating connections between the lever and plunger, automatic means to periodically reciprocate the lever and thereby actuate the plunger, a stationary rack, a rack on the lever, a pinion in mesh with said racks and forming a fulcrum for the lever, a manual device operable to rotate the pinion and thereby shift the fulcrum of the lever while the feeder is operating, and manual means for adjusting the plunger up or down relatively to the lever during the operation of the feeder.

Signed at Toledo, in the county of Lucas and State of Ohio, this 30th day of August, 1923.

ALBERT N. CRAMER.